United States Patent
Krüger et al.

(10) Patent No.: US 6,346,587 B1
(45) Date of Patent: Feb. 12, 2002

(54) METHOD FOR THE PRODUCTION OF PARTIALLY FLUORINATED FLUOROPOLYMERS

(75) Inventors: Ralf Krüger, Beaumont, TX (US); Gerhard Heilig, Bergisch Gladbach; Claus Dieter Sommerfeld, Overath, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/646,436
(22) PCT Filed: Mar. 11, 1999
(86) PCT No.: PCT/EP99/01555
  § 371 Date: Sep. 18, 2000
  § 102(e) Date: Sep. 18, 2000
(87) PCT Pub. No.: WO99/48937
  PCT Pub. Date: Sep. 30, 1999

(30) Foreign Application Priority Data

Mar. 23, 1998 (DE) .......................................... 198 12 755

(51) Int. Cl.⁷ .............................. C08F 2/38; C08F 14/18; C08F 2/06
(52) U.S. Cl. .................... 526/206; 526/227; 526/230.5; 526/231; 526/242
(58) Field of Search .............................. 526/206, 230.5, 526/231, 242

(56) References Cited

U.S. PATENT DOCUMENTS

| | | | |
|---|---|---|---|
| 4,035,565 A | 7/1977 | Apotheker et al. | .......... 526/249 |
| 4,973,633 A | 11/1990 | Moore | .......... 526/247 |
| 5,032,655 A | 7/1991 | Moore | .......... 526/247 |
| 5,811,604 A | * 9/1998 | Benson | .......... 570/167 |

OTHER PUBLICATIONS

Modern Fluoropolymers, John Wiley & Sons Ltd., Cheichester, (month unavailable) 1997, pp. 77–90, Fluorocarbon Elastomers.
Modern Fluoropolymers, John Wiley & Sons Ltd., (month unavailable) 1997, pp. 115–125, Bowers, Processing of Fluoroelastomers.
Modern Fluoropolymers, John Wiley & Sons Ltd., (month unavailable) 1997, pp. 601–609 Fluoroelastomers.

* cited by examiner

*Primary Examiner*—Fred Zitomer
(74) *Attorney, Agent, or Firm*—Joseph C. Gil; Noland J. Cheung

(57) ABSTRACT

The present invention relates to a process for the production of partially fluorinated fluoropolymers, in accordance with which fluoromonomers are free-radically polymerized in the presence of polyfluoropropanes or polyfluorobutanes of the formulae $CF_3$—$CH_2$—$CF_2H$, $CF_3$—$CHF$—$CF_2$—H, $CF_3$—$CH_2$—$CF_3$, $CHF_2$—$CF_2$—$CH_2F$, $CF_3$—$CH_2$—$CF_2$—$CH_3$ AND $CF_3$—$CHF$—$CF_2$—$CH_3$ and optionally a chain-transfer agent.

5 Claims, No Drawings

METHOD FOR THE PRODUCTION OF PARTIALLY FLUORINATED FLUOROPOLYMERS

FIELD OF THE INVENTION

The present invention relates to a process for the production of partially fluorinated fluoropolymers, in accordance with which fluoromonomers are free-radically polymerized in the presence of polyfluoropropanes or polyfluorobutanes of the formulae $CF_3$—$CH_2$—$CF_2H$, $CF_3$—$CHF$—$CF_2H$, $CF_3$—$CH_2$—$CF_3$, $CHF_2$—$CF_2$—$CH_2F$, $CF_3$—$CH_2$—$CF_2$—$CH_3$ and $CF_3$—$CHF$—$CF_2$—$CH_3$ and optionally a chain-transfer agent.

BACKGROUND OF THE INVENTION

Fluoropolymers are produced on an industrial scale substantially using known aqueous emulsion or suspension polymerization processes, as described, for example, in *Modern Fluoropolymers*, John Wiley & Sons Ltd., Chichester, 1997, pp. 77 and 609. Water-soluble auxiliaries, such as fluorinated emulsifiers, dispersants, initiators etc. are required in these processes which, once the resultant polymer dispersion has been worked up, may be found in part in the product and in part in the waste water, where they cause problems with regard to product properties or the environmental compatibility of the process.

Non-aqueous processes have hitherto been based upon chlorofluorocarbons, such as 1,2-dichlorotetrafluoroethane or 1,1,2-trichlorofluoroethane. However, these compounds have an elevated ozone degrading potential, for which reason industrial use thereof is already prohibited in many industrial nations.

U.S. Pat. No. 4,243,770 mentions the possibility of using other inert compounds containing fluorine, such as perfluoro (1,2-dimethylcyclobutane), perfluorocyclohexane, perfluoro (tributylamine) and compounds of the type $H(CF_2)_nH$ and $CF_3O(C_2F_4O)_nCF_2CF_3$, apart from the stated chlorofluorocarbons, as solvents for the polymerization of fluoromonomers.

U.S. Pat. No. 5,182,342 describes the use of fluorinated hydrocarbons which satisfy certain criteria with regard to the F/H ratio and the position of the hydrogen atoms and may optionally contain ether oxygen atoms for this purpose, such as for example 1,1,2,2-tetrafluorocyclobutane, 1-trifluoromethyl-1,2,2-trifluorocyclobutane, $CF_3(CF_2)_nCFH(CF_2)_mCF_3$, $CF_3(CF_2)_nCFHCFH(CF_2)_mCF_3$, $CF_3(CF_2)_nCH_2(CF_2)_mCF_3$, $CF_3(CF_2)_nCFHCH_2(CF_2)_mCF_3$, $C_4F_9CH_2CH_2C_4F_9$. However, compounds which, with the exception of the permitted structural unit —$CF_2OCH_3$, contain a hydrogen atom on the terminal (primary) C atom are explicitly excluded.

Fluorinated hydrocarbons having terminal hydrogen atoms, for example $CF_3(CF_2)_nH$, $CF_3(CF_2)_nCH_2CH_3$, as well as those of the type $CF_3CF(CF_3)CFHCFHCF_3$, are described in U.S. Pat. No. 5,494,984 in addition to those mentioned above as polymerization media for fluoromonomers.

It has not hitherto been possible to use fluorinated hydrocarbons having fewer than 4 C atoms in known processes for the production of fluoropolymers. The compounds hitherto used have also been very highly fluorinated compounds, in which partially fluorinated fluoropolymers, which also comprise —$CH_2$ sequences in addition to fluoro-substituted carbon atoms, are very sparingly soluble. Moreover, on grounds of price and availability, none of these compounds is suitable as a polymerization medium. The production thereof generally proceeds by oligomerization/ telomerisation of fluoromonomers (tetrafluoroethylene, hexafluoropropene, hexafluoropropene oxide) and subsequent hydrogenation or hydrogen fluoride addition.

However, increasing the H/F ratio as a pre-requisite for improving polymer solubility generally results in an increase in the transfer potential, which is undesirable for a polymerization solvent, as this latter property is usually also associated with a terminating chain transfer.

SUMMARY OF THE INVENTION

The object of the present invention was accordingly to provide a simple production process for partially fluorinated fluoropolymers which operates without using ozone-damaging compounds.

It has now been found that partially fluorinated fluoropolymers may be produced in a very simple manner by using certain polyfluoropropanes or polyfluorobutanes.

DETAILED DESCRIPTION OF THE INVENTION

The present invention provides a process for the production of partially fluorinated fluoropolymers, in accordance with which fluoromonomers are free-radically polymerization in the presence of fluorinated hydrocarbons of the formulae $CF_3$—$CH_2$—$CF_2H$, $CF_3$—$CHF$—$CF_2H$, $CF_3$—$CH_2$—$CF_3$, $CHF_2$—$CF_2$—$CH_2F$, $CF_3CH_2$—$CF_2$—$CH_3$ and/or $CF_3$—$CHF$—$CF_2$—$CH_3$, preferably 1,1,1,3,3-pentafluoropropane, and optionally a chain-transfer agent.

Partially fluorinated fluoropolymers for the purposes of the invention have a main chain formed of carbon atoms, which chain also comprises —$CH_2$ sequences as well as fluoro-substituted sequences. These may be either homo- or copolymers of vinylidene fluoride with other fluorinated and also non-fluorinated monomers or copolymers of fluorinated monomers, containing no hydrogen, with non-fluorinated monomers.

Fluoromonomers which may be used for the purposes of the invention are fluorinated, optionally substituted ethylenes, which, apart from fluorine, may contain hydrogen and/or chlorine, such as for example vinylidene fluoride, tetrafluoroethylene and chlorotrifluoroethylene, fluorinated 1-alkenes having 2–8 carbon atoms, such as for example hexafluoropropene, 3,3,3-trifluoropropene, chloropentafluoropropene, hexafluoroisobutene and/or perfluorinated vinyl ethers of the formula $CF_2$=$CF$—$O$—$X$, where $X=C_1-C_3$ perfluoroalkyl or —$(CF_2$—$CFY$—$O)_n$—$R_F$, wherein n=1–4, Y=F or $CF_3$ and $R_F=C_1-C_3$ perfluoroalkyl.

Olefins containing no fluorine, such as ethylene, propene, isobutene, alkyl vinyl ethers or vinyl esters, such as for example vinyl acetate, which are copolymerizable with fluoromonomers may furthermore additionally be used as comonomers.

Examples of such copolymer combinations are, for example, vinylidene fluoridelhexafluoropropene, optionally together with tetrafluoroethylene and/or perfluoro(methyl vinyl ether), tetrafluoroethylene/ethylene, tetrafluoroethylene/vinylidene fluoride, tetrafluoroethylene/ propene, tetrafluoroethylene/propene/vinylidene fluoride and tetrafluoroethylene/vinyl acetate.

It is additionally possible also to use copolymerizable monomers containing iodine or bromine, such as for example bromotrifluoroethylene, 4bromo-3,3,4,4- tetrafluoro-1-butene, as described in U.S. Pat. No. 4,035, 565, or 1-bromo-2,2-difluoroethylene for the production of peroxide-vulcanisable fluororubbers.

In a preferred embodiment of the invention, water is additionally present in a quantity of 10 to 900 parts by weight relative to 100 parts by weight of the polyfluoropropenes or polyfluorobutanes used according to the invention.

The free-radical polymerization is preferably initiated by means of initiators.

Organic or fluoro-organic dialkyl peroxides, diacyl peroxides, dialkyl peroxy-dicarbonates, alkyl peresters and/or perketals, such as for example tert.-butyl peroxypivalate, tert.-butyl peroxy-2-thylhexanoate, dicyclohexyl peroxydicarbonate, bis(trifluoroacetyl peroxide) or the peroxide of hexafluoropropene oxide dimers $\{(CF_3CF_2CF_2O CF(CF_3)COO\}_2$ are preferably used as the initiator. The initiator which is used and the quantity in which it is used is determined by the particular reaction temperature, at which the half-life of the peroxide to be selected should be between 30 and 500 min. Quantities of between 0.05 and 1.0 part by weight of peroxide per 100 parts by weight of monomers to be reacted are preferred.

When the polymerization is performed as suspension or emulsion polymerisation in the presence of water, which is additionally added to the fluorinated hydrocarbons according to the invention, it is also possible to use water-soluble initiators or redox systems, in which one or both of the components (reducing and oxidizing agent) are water-soluble, such as for example potassium peroxydisulfate, potassium permanganate/oxalic acid or peroxydisulfate/perfluoroalkyl sulfinate.

The molecular weights and thus the viscosities of the desired products may be adjusted by means of the quantity of initiator or by addition of one or more chain-transfer agents.

Preferably used chain-transfer agents are compounds of the formula (III)

$$R^3Br_aI_b \qquad (III)$$

where a or b=0 to 2 and a+b=1 or 2, wherein $R^3$ may be an aliphatic hydrocarbon, fluorinated hydrocarbon, chlorofluorocarbon or fluorocarbon residue having 1–8 carbon atoms. These may comprise, for example, 1,2-dibromo-1-chlorotrifluoroethane and/or 1-bromo-2-iodotetrafluoroethane. More preferred diiodo-organic compounds are those in which both iodine atoms are attached to the same or to different carbon atoms. Most preferred hydrocarbon or fluorocarbon compounds are those having 1 or 4 carbon atoms, wherein the iodine is located on the terminal carbon atoms. Diiodomethane and/or 1,4-diiodoperfluorobutane are likewise very preferred. The quantity of diiodo-organic compound is preferably 0.1–3.0 parts by weight of iodine per 100 parts by weight of polymerized fluoromonomer.

The polyfluoropropanes or polyfluorobutanes used in the process according to the invention preferably have an H/F ratio of 1/3 to 3/3.

Thanks to the particular distribution of the hydrogen atoms, it is ensured that no transfers from the solvent occur which impair the reaction or product properties. If, for example, 1,1,1,4,4,4-hexafluorobutane is used instead of the 1,1,1,3,3-penta-fluorobutane used according to the invention, considerable retardation of polymerization is observed.

The polyfluoropropanes or polyfluorobutanes used according to the invention are produced using known processes (c.f. for example *Zh. Org. Khim.* 1980, 1401–1408 and 1982, 946 and 1168; *Zh. Org. Khim.* 1988, 1558; *J. Chem. Soc. Perk*, 1, 1980, 2258; *J. Chem. Soc. Perk Trans.*, 2, 1983, 1713; *J. Chem. Soc.* C 1969, 1739; *Chem. Soc.* 1949, 2860; *Zh. Anal. Khim.* 1981 36(6), 1125; *J. Fluorine Chem.* 1979, 325; *Rosz. Chem.* 1979 (48), 1697, *J. Amer. Chem. Soc.* 67, 1195 (1945), 72, 3577 (1950) and 76, 2343 (1954)). Since the boiling points of these fluorinated hydrocarbons are between approx. −1 and 40° C., they may readily be removed from the product on completion of polymerization. Any possible secondary products, which may arise from the initiator and/or the chain-transfer agents, have higher boiling points, such that the solvent may be recovered again in very pure form.

The reaction temperatures for the free-radical polymerization are preferably between 30 and 130° C. Lower temperatures result in a dramatic extension of running time and in a sharp increase in the viscosity of the polymer solution, such that problems may occur with regard to mass transfer, heat dissipation and product discharge. The space-time yield cannot be raised substantially firther with still higher temperatures, while product properties are degraded. A preferred temperature range for polymerization is 60–100° C.

The pressure during polymerization is dependent upon the above-stated conditions and upon the composition of the monomer mixture and is preferably between 10 and 100 bar. The process according to the invention is more preferably performed at pressures of between 15 and 50 bar.

The free-radical polymerization may be performed by batch, continuous or batch/feed processes in stirred tank reactors, wherein the batch/feed process is preferred.

Once polymerization is complete, the reaction mixture may readily be discharged or expressed from the tank via a bottom discharge or riser pipe. Residual monomers and the solvent may then readily be separated from the polymer by releasing the pressure.

The polymer solution may, however, also be used without further working up as a coating material, which use is also provided by the present invention. Substrates which may be considered for coating are, for example, metals, plastics, textiles, leather, paper and nonwovens.

Due to their low boiling points, the solutions according to the invention may also readily be sprayed onto substrate surfaces by intrinsic pressure. If curing is required after application, the coatings according to the invention may be vulcanized using known methods, for example by free-radical methods by means of co-vulcanizing agents and light or peroxides, with polyamines or polyols and with the assistance of diisocyanates, if the polymer contains hydroxyl groups.

Fluororubbers produced using process according to the invention may be compounded and vulcanized using conventional methods, c.f. *Modern Fluoropolymers*, John Wiley & Sons Ltd., Chichester, 1997, pp. 78, 115, 601. Thanks to their low viscosity, the fluororubbers may be firther processed to yield elastic moldings by using advantageous injection moulding techniques.

Compounds suitable for vulcanization are bisnucleophiles, such as bisamines, for example hexamethylenediamine, or bisphenols, for example 2,2-bis (4-hydroxy-phenyl)hexafluoropropane ("Bisphenol AF") in combination with vulcanisation accelerators, such as quaternary phosphonium, ammonium or sulfonium salts and acid acceptors, such as magnesium oxide and calcium hydroxide, c.f. A. L. Logothetis in *Polym. Sci.* 14 (1989) 251–296 and the literature cited therein. Alternatively, fluororubbers which have been produced by the process according to the invention and contain bromine and/or iodine covalently bonded to the carbon main or side chain, may be vulcanised by organic peroxides such as 2,5-dimethyl-2,5-bis(tert.-butyl)hexane in combination with co-vulcanising agents such as triallyl isocyanurate (c.f. for example EP-A 398 241).

The present invention also provides the use of 1,1,1,3,3-pentafluoropropane as process solvent for the polymerization of fluoromonomers.

The following Examples illustrate the invention, but do not limit it.

PRACTICAL EXAMPLE

Example 1

A sealed 4.1 L autoclave cooled to $\leq 5°$ C. was inertised by being evacuated and purged three times with nitrogen. A solution of 836 g of 1,1,1,3,3-pentafluoropropane and 18.6 g of 1,2-dibromochlorotrifluoroethane was sucked in through a tube, likewise provided with an inert atmosphere. 440 g of vinylidene fluoride (VDF) and 1028 g of hexafluoropropene (HFP) were then added and the reaction mixture heated to 80° C. while being stirred. Once this temperature had been reached, the internal pressure in the autoclave was 34 bar. Polymerization was initiated by adding 2.5 g of tert.-butyl peroxy-2-ethylhexanoate (Peroxid-Chemie GmbH). Polymerization began after a few minutes, as indicated by the pressure beginning to fall. During polyrerization, a monomer mixture comprising 60 wt. % vinylidene fluoride and 40 wt. % hexafluoropropene was pumped in such that the internal pressure in the autoclave was held constant at 34±0.4 bar. In this manner, a total of 303 g of vinylidene fluoride and 196 g of hexafluoropropene were apportioned within a reaction time of 455 min. Once polymerization was complete, the unreacted monomer mixture was removed from the reactor by depressurization and evacuation. 15 minutes after the stirrer had been turned off, the remaining contents of the reactor, assuming the form of a solution of the polymer in 1,1,1,3,3-pentafluoropropane, were completely discharged via a bottom outlet valve into a second pressure vessel located beneath. The polymer solution was dried for 24 hours at 60° C. in a vacuum drying cabinet, wherein the solvent was condensed in a cold trap, and 493 g of a high viscosity copolymer were obtained.

The following copolymer composition was determined by $^{19}$F-NMR analysis (solvent: acetone; standard: $CFCl_3$): 22.7 mol % hexafluoropropene, 77.2 mol % vinylidene fluoride. The bromine content of the polymer, determined by elemental analysis, was 0.9 wt. %, while the chlorine content was 0.2 wt. %.

Molecular weights were determined by performing gel permeation chromatographic (GPC) measurements with RI detection in dimethylacetamide (DMAC) at 40° C. with the addition of 1 g/l of LiBr. Evaluation was performed using a special calibration curve for polyethylene oxide, which had been calibrated by membrane osmosis measurements. The number and weight average molecular weights (Mn, Mw) are shown in Table 1.

Example 2

Polymerization was performed in a similar manner as in Example 1, but with 12.0 g of diiodomethane as chain transfer agent instead of 1,2-dibromochlorotrifluoroethane and with addition of 2.21 g of tert.-butyl peroxy-2-ethylhexanoate at the beginning of the reaction and 1.1 g once a total of 300 g of monomers had been apportioned.

A total of 412 g of vinylidene fluoride and 264 g of hexafluoropropene were apportioned within a reaction time of 1032 min. 714 g of a high viscosity copolymer could be isolated by working up in a similar manner as in Example 1.

The composition of the copolymer is 77.8 mol % hexafluoropropene, 22.2 mol % vinylidene fluoride. The iodine content of polymer is 1.45 wt. %.

Table 1 shows the results of the GPC analysis.

A vulcanizable composition was produced by incorporating 30 parts of carbon black MT N 990, 3 parts of calcium hydroxide, 4 parts of Perkalink 301/50 (triallyl isocyanurate, 50% on silica gel) and 3 parts of Luperco 101 XL45 (2,5-dimethyl-2,5-bis(tert.-butylperoxy)hexane; 45% in inactive fillers) into 100 parts by weight of the fluororubber copolymer on a well cooled two roll mixing mill.

Vucanization behavior was determined by investigating the composition containing peroxide in a Monsanto model MDR 2000 E rheometer at 170° C. (measurement time 30 min).

The composition was pressure vulcanized for 15 min at 170° C. and 200 bar in molds to produce 1×10×10 mm sheets and then post-vulcanised in a circulating air oven (1 h at 160° C., 1 h at 170° C., 2 h at 180° C. and 20 h at 230° C.). Tension/elongation properties were determined on the vulcanized mouldings. The results are listed in Table 2.

Example 3

Polymerization was performed in a similar manner as in Example 1, but without addition of a chain-transfer agent.

A total of 182 g of vinylidene fluoride and 116 g of hexafluoropropene were apportioned within a reaction time of 660 min. 292 g of a rubbery copolymer could be isolated by working up in a similar manner as in Example 1. Copolymer composition was 77.8 mol % VDF, 22.2 mol % HFP. Table 1 shows the results of the GPC analysis.

A vulcanizable composition was produced by incorporating 30 parts of carbon black MT N 990, 6 parts of calcium hydroxide, 3 parts of magnesium oxide (Maglite D) and 4 parts of a mixture of bisphenol AF and Viton A (50:50 parts by weight) and 2 parts of a mixture of benzyltriphenylphosphonium chloride with Viton A (33:66 parts by weight) into 100 parts by weight of the fluororubber copolymer on a well cooled two roll mixing mill.

The results of vulcanization testing are also shown in Table 2.

Example 4

1155 g of 1,1,1,3,3-pentafluoropropane, 0.3 g of tert.-butyl peroxy-2-ethylhexanoate and 18 g of diiodomethane together with a monomer mixture of 416 g of vinylidene fluoride, 1170 g of hexafluoropropene and 71 g of tetrafluoroethylene were initially introduced in a similar manner as in Example 1 with the 4.1 L autoclave being cooled to $\leq 5°$ C. Once the reaction mixture had been heated to 80° C., the internal pressure in the autoclave was 34 bar. After a reaction time of 3 h at 80° C., 19.9 ml of a solution of tert.-butyl peroxy-2-ethylhexanoate in 1,1,1,3,3-pentafluoropropane (50 g/l) were apportioned. In order to maintain the initial pressure, a monomer mixture consisting of 53 wt. % of vinylidene fluoride, 34 wt. % of hexafluoropropene and 13 wt. % of tetrafluoroethylene was apportioned. Once a total of 300 g and 600 g of monomer had been apportioned, a further 12.4 ml of the above-stated peroxide solution was added in each instance.

A total of 599 g of vinylidene fluoride, 283 g of hexafluoropropane and 108 g of tetrafluoroethylene was consumed within a reaction time of 859 min. 1025 g of a highly viscous copolymer could be isolated by working up in a similar manner as in Example 1.

Copolymer composition was 70.8 mol % of VDF, 18.4 mol % of HFP and 10.8 mol % of TFE. Iodine content was 1.6 wt. %.

Example 5

In a similar manner as in the preceding Examples, 836 g of 1,1,1,3,3-pentafluoro-propane, 660 g of vinylidene fluoride were initially introduced into the 4.1 L autoclaves. Polymerization was initiated at 80° C. and a pressure of 41 bar by addition of 2.5 g of tert.-butyl peroxy-2-ethylhexanoate. 394 g of vinylidene fluoride were apportioned within 20 h while maintaining the internal pressure in the autoclave.

408 g of a VDF homopolymer powder were isolated having a DSC melting point of 167° C.

Comparative Example 1
Bulk Polymerization 15.3 g of diiodoperfluorobutane (DIPFB, Fluorochem Ltd., after prior purification by extraction with aqueous sodium thiosulfate solution), 771 g of VDF and 2118 g of HFP were initially introduced into a 4.1 L autoclave, which had been rendered inert by repeated evacuation and nitrogen depressurisation, and the mixture heated to 60° C. while being stirred. Once this temperature had been reached, the internal pressure in the autoclave was 37.7 bar. Polymerization was initiated by adding 4.25 g of tert.-butyl peroxypivalate in the form of TBPPI-75-AL (solution in aliphatic compounds, peroxide content 47.1%, Peroxid-Chemie GmbH).

A total of 308 g of vinylidene fluoride and 202 g of hexafluoropropene were apportioned within a reaction time of 1779 min. Once polymerisation was complete, the unreacted monomer mixture was removed from the reactor by depressurisation and evacuation. The polymer could not be discharged from the autoclave by simple draining as in Examples 1–3. The polymer was removed by being dissolved in 3 L of acetone and precipitated from this solution with n-hexane. After drying, 481 g of a highly viscous copolymer were obtained with the composition 76.7 mol % VDF and 23.3 mol % HFP and 1 wt. % iodine.

A vulcanizable composition was produced in a similar manner as in Example 1. The results are also shown in Table 2.

This Comparative Example shows that, despite initially introducing a substantially larger quantity of monomer, when polymerization is performed in pure liquid monomer phase, a distinctly lower space-time yield is achieved and discharging the product is highly problematic. Moreover, chain transfer is clearly rendered more difficult, resulting in lower incorporation of iodine and poorer vulcanisability.

Comparative Example 2
(Use of an alternative fluorinated hydrocarbon: 1,1,1,4,4,4-hexafluorobutane as polymerisation medium, similar to U.S. Pat. No. 5,182,342)

Polymerisation was performed in a similar manner as in Example 2, but using 829 g of 1,1,1,4,4,4-hexafluorobutane instead of the 1,1,1,3,3-pentafluoropropane. The internal pressure in the autoclave was 29 bar once the initial quantity of monomers had been introduced and the reaction temperature of 80° C. had been reached.

A total of 214 g of vinylidene fluoride and 147 g of hexafluoropropene were apportioned within a reaction time of 1320 min.

As in Examples 1 and 2, once the residual monomers had been removed, the reaction mixture assumed the form of a uniform polymer solution, from which the solvent was removed by distillation. 387 g of a copolymer comprising 78.1 mol % VDF and 21.9 mol % HFP and having an iodine content of 2.2 wt. % are obtained.

A vulcanizable composition was produced in a similar manner as in Example 1. The results are also shown in Table 2.

This Comparative Example shows that the space-time yield is distinctly lower when a fluorinated hydrocarbon is used which differs from that according to the invention with regard to the distribution of the hydrogen atoms.

Comparative Example 3

Polymerization similar to Example 2, using trifluoroethanol (used in Examples 7, 25, of U.S. Pat. No. 5,182,342)

In a similar manner as in Example 1, 438 g of 2,2,2-trifluoroethanol and 7.6 g of diiodoperfluorobutane together with a monomer mixture of 289 g of vinylidene fluoride and 666 g of hexafluoropropene were initially introduced into the 4.1 L autoclave. Once the reaction mixture had been heated to 80° C., the internal pressure in the autoclave was 35 bar. Polymerization was initiated by adding 1.24 g of tert.-butyl peroxy-2-ethylhexanoate. After an initially brisk reaction, the reaction came to a standstill after approx. 10 h. Up to that point, 102 g of vinylidene fluoride and 44 g of hexafluoropropene had been apportioned to maintain the internal pressure in the autoclave.

The test was terminated after 20 h, the unreacted monomer mixture depressurized and the reaction mixture discharged. The resultant polymer was not dissolved in the trifluoroethanol, but instead assumed the form of a swollen, separate phase. The yield was 185 g of a highly viscous copolymer.

This Comparative Example shows that trifluoroethanol is clearly not sufficiently inert during the polymerisation and secondary reactions occur which result in termination of the reaction.

TABLE 1

| | GPC results | | |
|---|---|---|---|
| Example | 1 | 2 | 3 |
| Mn | 15.5 | 17.4 | 39.6 |
| Mw | 28.5 | 27.1 | 68.4 |

TABLE 2

Vulcanization results and properties of the vulcanizates

| | Example | | | Comparative Example | |
|---|---|---|---|---|---|
| | 2 | 3 | 4 | 1 | 2 |
| MDR results | | | | | |
| s' min [dNm] | 0.02 | 0.06 | 0.01 | 0.03 | 0.02 |
| s' max (dNm) | 12.8 | 13.5 | 21.5 | 12.4 | 11.1 |
| tan $\delta_{max}$ | 0.09 | 0.15 | 0.08 | 0.16 | 0.07 |
| t 90 [min] | 6.4 | 2.2 | 6.5 | 4.6 | 9.2 |
| Mechanical | | | | | |
| Tensile strength [N/mm$^2$] | 10.9 | 10.0 | 12.6 | n.d. | 7.5 |
| Elongation [%] | 172 | 256 | 164 | n.d. | 96 |

TABLE 2-continued

Vulcanization results and properties of the vulcanizates

|  | Example | | | Comparative Example | |
|---|---|---|---|---|---|
|  | 2 | 3 | 4 | 1 | 2 |
| $S_{50}[N/mm^2]$ | 2.7 | 2.5 | 3.3 | n.d. | 3.4 |
| Compression set (70 h/200° C.) [%] | 37 | 33 | 32 | n.d. | n.d. | n.d.: not determined

What is claimed is:

1. A process for the production of partially fluorinated fluoropolymers, wherein fluoromonomers are free-radically polymerized in the presence of fluorinated hydrocarbons of the formulae $CF_3$—$CH_2$—$CF_2H$, $CF_3$—$CHF$—$CF_2H$, $CF_3$—$CH_2$—$CF_3$, $CHF_2$—$CF_2$—$CH_2F$, $CF_3$—$CH_2$—$CF_2$—$CH_3$ and/or $CF_3$—$CHF$—$CF_2$—$CH_3$, and optionally a chain-transfer agent.

2. A process according to claim 1, wherein water is additionally presend.

3. A process according to claim 1, wherein at least one initiator in the form of organic or fluoroorganic dialkyl peroxides, diacyl peroxides, dialkyl peroxydicarbonates, alkyl peresters and/or perketals is additionally used.

4. A process according to claim 1, wherein said chain transfer agent is at least one compound of the formula (III)

$$R^3Br_aI_b \qquad (III)$$

where a or b=0 to 2 and a+b=1 or 2, wherein $R^3$ may be an aliphatic hydrocarbon, fluorinated hydrocarbon, chlorofluorocarbon or fluorocarbon residue having 1–8 carbon atoms.

5. A process according to claim 1, wherein said fluorinated hydrocarbon is 1,1,1,3,3-pentafluoropropane.

* * * * *